(12) United States Patent
Lautenschlager (10) Patent No.: US 9,832,180 B2
(45) Date of Patent: *Nov. 28, 2017

(54) AUTHENTICATION SYSTEM AND METHOD FOR OPERATING AN AUTHENTICATION SYSTEM

(71) Applicant: Bojan Stopic, Munich (DE)

(72) Inventor: Manuel Lautenschlager, Munich (DE)

(73) Assignee: Bojan Stopic, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,234

(22) Filed: Jun. 19, 2015

(65) Prior Publication Data

US 2015/0288674 A1  Oct. 8, 2015

Related U.S. Application Data

(63) Continuation of application No. 13/854,696, filed on Apr. 1, 2013, now Pat. No. 9,094,387.

(30) Foreign Application Priority Data

Mar. 30, 2012  (EP) .................................... 12002325

(51) Int. Cl.
*G06F 7/04* (2006.01)
*H04L 29/06* (2006.01)
(Continued)

(52) U.S. Cl.
CPC .......... *H04L 63/08* (2013.01); *G07C 9/00158* (2013.01); *H04L 63/0861* (2013.01);
(Continued)

(58) Field of Classification Search
CPC ..... H04L 63/08; H04L 63/0861; H04L 63/18; G07C 9/00158

See application file for complete search history.

(56) References Cited

U.S. PATENT DOCUMENTS 7,870,599 B2 * 1/2011 Pemmaraju ............. G06F 21/32
340/5.8
2003/0163739 A1 * 8/2003 Armington ............. G06F 21/32
726/3

(Continued)

FOREIGN PATENT DOCUMENTS

WO PCT/US2005/026700 A2   2/2006

*Primary Examiner* — Techane Gergiso
(74) *Attorney, Agent, or Firm* — Park, Vaughan, Fleming & Dowler LLP (57) ABSTRACT

An authentication system for authenticating a human requester requesting a service, wherein the authentication system is configured to establish via a first and a second port of the authentication system an authentication communication channel comprising a first communication channel to the requester and a second communication channel to a human authenticator, such that at least one of an audio stream of a voice of the requester, a video stream of a face of the requester and a 3D-data stream of the face of the requester is transmittable between the end node device of the requester and the end node device of the authenticator; and to record a confirmation message of the authenticator, wherein the confirmation message confirms or rejects at least one of the claimed identity and the requested service.

24 Claims, 4 Drawing Sheets

Related U.S. Application Data (60) Provisional application No. 61/617,866, filed on Mar. 30, 2012.

(51) Int. Cl.
*G07C 9/00* (2006.01)
*G06F 21/31* (2013.01)
*G06F 21/32* (2013.01)
*G06F 21/30* (2013.01)

(52) U.S. Cl.
CPC .............. *H04L 63/18* (2013.01); *G06F 21/30* (2013.01); *G06F 21/313* (2013.01); *G06F 21/32* (2013.01); *G07C 2209/04* (2013.01); *H04L 63/105* (2013.01)

(56) References Cited

U.S. PATENT DOCUMENTS

| | | | |
|---|---|---|---|
| 2005/0268107 A1* | 12/2005 | Harris | G06F 21/31 713/182 |
| 2006/0029190 A1 | 2/2006 | Schultz | |
| 2006/0078172 A1* | 4/2006 | Zhang | G06K 9/00268 382/118 |
| 2006/0104485 A1 | 5/2006 | Miller, Jr. | |
| 2006/0119616 A1* | 6/2006 | Park | G06Q 30/0603 345/619 |
| 2006/0120569 A1* | 6/2006 | Kim | G06K 9/00362 382/115 |
| 2006/0277043 A1* | 12/2006 | Tomes | G10L 17/24 704/247 |
| 2007/0047533 A1 | 3/2007 | Criddle et al. | |
| 2007/0196000 A1* | 8/2007 | Kittler | G06K 9/00221 382/118 |
| 2008/0119165 A1* | 5/2008 | Mittal | H04L 29/06027 455/411 |
| 2008/0141353 A1* | 6/2008 | Brown | G10L 13/00 726/7 |
| 2009/0025075 A1* | 1/2009 | Chow | H04L 63/0823 726/10 |
| 2009/0077601 A1* | 3/2009 | Brailean | H04L 29/06027 725/109 |
| 2009/0288148 A1* | 11/2009 | Headley | H04L 9/3271 726/5 |
| 2010/0082983 A1* | 4/2010 | Shah | H04L 63/061 713/169 |
| 2011/0197070 A1* | 8/2011 | Mizrah | H04L 63/0869 713/176 |
| 2011/0302645 A1* | 12/2011 | Headley | H04L 9/3271 726/7 |
| 2012/0005030 A1* | 1/2012 | Valin | G06Q 20/10 705/14.73 |
| 2012/0159603 A1* | 6/2012 | Queck | H04L 9/3215 726/9 |
| 2012/0233072 A1* | 9/2012 | Calman | G06Q 40/02 705/44 |
| 2013/0347089 A1* | 12/2013 | Bailey | H04L 9/3215 726/7 |

* cited by examiner

| class combination | line difference factor |
|---|---|
| A+C | 10 |
| B+C | 8 |
| A+B | 5 |
| A+A | 1 |
| A+A | 1 |
| A+A | 1 |

100

| Class A | Class B | Class C |
|---|---|---|
|  | R2 | R1 |
| A1 | A2 | A3 |

US 9,832,180 B2

AUTHENTICATION SYSTEM AND METHOD FOR OPERATING AN AUTHENTICATION SYSTEM

RELATED APPLICATIONS

This application is a continuation of, and hereby claims priority to, pending U.S. patent application Ser. No. 13/854,696, entitled "Authentication System and Method for Operating an Authentication System," by the same inventor as the instant application, which was filed on 1 Apr. 2013. U.S. patent application Ser. No. 13/854,696 claims priority to U.S. Provisional Patent Application No. 61/617,866 filed 30 Mar. 2012, entitled "Authentication System and Method for Operating an Authentication System" by the same inventors as the instant application. U.S. patent application Ser. No. 13/854,696 also claims priority to European Patent Application No. 12 002 325.4 by the same inventors as the instant application filed on 30 Mar. 2012. All of the above-identified applications are herein incorporated by reference in their entirety for all purposes.

TECHNICAL FIELD

This invention relates to an authentication system, for confirming an identity claimed by a requester, who requests a service via a communication channel. In particular, the present invention relates to an authentication system for authenticating a requester based on an audio and/or video conference between the requester and an authenticator selected by the authentication system.

BACKGROUND ART

Services, such as transactions between bank accounts, are nowadays mostly initiated via wired or wireless communication channels, such as telephone networks or the Internet. Access to such services is typically controlled by authentication procedures. The most widely applied authentication procedures range from simple techniques, such as requesting a username and a password, to technically more advanced procedures, which rely on biometric data, which are read by a biometric sensor, such as a fingerprint capturing module.

Generally speaking, technically complex and cost-intensive technologies are required to ensure a high level of security. However, even complex technologies, which are nowadays applied, are often vulnerable to attacks such as a man-in-the-middle attack. In such a man-in-the-middle attack, the attacker sets up independent connections with the service requester and the service provider. Then, the attacker relays messages between them, making them believe that they are communicating directly to each other over a secure connection. Thereby, for example, an attacker may retrieve biometric data from a requester, which can be used to compromise the service provider system. Attackers may also use tools, such as keystroke loggers, sniffers or trojans to manipulate a system to forward calls. Mobile phones, used by requesters may be spied using an IMSI-catcher.

The various services, which are offered by a service provider, often differ tremendously in the desired security level. For example, the amount of money, which is transferred by bank transactions may vary considerable between single transactions. Therefore, technically complex and cost-intensive solutions are only implementable for a small number of service requests.

Hence, there is a need to offer an authentication system, which is configurable for very high security with minimal additional costs.

This problem is solved by the subject-matter of the independent claims. Further embodiments are subject of the dependent claims.

SUMMARY

Embodiments provide an authentication system for authenticating a requester requesting a service, the authentication system comprising: a first port, configured such that a first communication channel is establishable via an end node device of the requester and a communication link between the first port and the end node device of the requester; a second port, configured such that a second communication channel is establishable via an end node device of an authenticator and a communication link between the second port and the end node device of the authenticator; and a storage device configured to store a plurality of contact data entries; wherein the authentication system is configured to record an identity claimed by the requester and a service requested by the requester; to select from the plurality of contact data entries a contact data entry of the end node device of the authenticator; to establish the second communication channel depending on the selected contact data entry; to establish via the first and the second port an authentication communication channel comprising the first communication channel and the second communication channel such that at least one of an audio stream of a voice of the requester, a video stream of a face of the requester and a 3D-data stream of the face of the requester is transmittable between the end node device of the requester and the end node device of the authenticator; and to record a confirmation message of the authenticator, wherein the confirmation message confirms or rejects at least one of the claimed identity and the requested service.

Accordingly, an authentication system is provided, which allows an authenticator to confirm the claimed identity of the requester or to confirm the requested service by listening to the voice of the requester and/or by watching a face image of the requester's face. Thereby, it is possible for the authenticator to reliably authenticate the claimed identity of the requester. Hence, a high security level is ensured, making it difficult or even impossible for attackers to gain illegitimate access to services.

Each of the requester and the authenticator are persons. The requester may request to access the requested service. The authentication system may be configured to perform authentication of the requester and to forward the service request to a service provider, such as a bank employee, or an online bank service system. The claimed identity and the requested service may be recorded by the authentication system via the first communication channel.

The authentication system may comprise a computer system. The computer system may comprise a storage device. Executable code stored on the computer system may provide instructions for implementing the operation of the authentication system.

The executable code may comprise an API (application programming interface). The API may provide a programming interface for calling procedures from third-party-software and/or internal usage. Authentication requests may be sent to a third-party-software that is configured to communicate with the API. The third-party-software may use the API to trigger the authentication process performed by the authentication system and/or to configure the authentication system.

Recording a claimed identity and/or recording the service requested by the requester may comprise storing and/or analyzing an audio stream transmitted from the requester to the authentication system. The audio stream may be captured with a microphone of an end node device of the requester. Additionally or alternatively, data may be stored, which correspond to digits, which have been clicked by the requester on a keypad of the end node device of the requester. Recording the identity claimed by the requester, a service requested by the requester and/or the confirmation message may comprise storing the claimed identity, the requested service and/or the confirmation message on the storage device, in particular a random access storage device of the authentication system.

A second communication channel is established to the authenticator. The second communication channel may be established depending on a contact data entry selected from a plurality of contact data entries. The plurality of contact data entries may be stored on a storage device of the authentication system. In other words, the contact data entry is used to contact the authenticator. For example the contact data entry is a phone number and the authenticator's phone is called.

The first communication channel may be established by the requester. The requested service and/or the claimed identity may be transmitted via the first communication channel. Alternatively, the authentication system may be configured to establish the first communication channel after the claimed identity has been recorded. The authentication system may be configured to select a contact data entry of the end node device of the requester from the plurality of contact data entries stored on the storage device of the authentication system.

The authentication system may be configured to establish a first session with the end node device of the requester via the first communication channel. Furthermore, the authentication system may be configured to establish a second session with the end node device of the authenticator via the second communication channel. Establishing the authentication communication channel may comprise merging the first session and the second session to an authentication session. The authentication system may be configured to split the authentication session after the authenticator and/or the requester has indicated that the authentication has been finished.

The first and/or the second ports may be physical or logical ports. The authentication communication channel is established via the first port and the second port. Thereby, the authentication communication channel comprises the first communication channel, the second communication channel, the first port and the second port. Establishing the authentication communication channel may comprise merging or combining a communication thread of the requester and a communication thread of the authenticator. The communication thread of the requester is connected to the first communication channel, and the communication thread of the authenticator is connected to the second communication channel. The authentication system may comprise a conferencing bridge for establishing the authentication communication channel between the end node device of the requester and the end node devices of one or more authenticators.

At least one of an audio stream of a voice of the requester, a video stream of a face of the requester and a 3D-data stream of the face of the requester is transmittable between the end node device of the requester and the end node device of the authenticator. In other words, it is possible for the authenticator to listen to the voice of the requester and/or to view an image of the face of the requester. Thereby, it is possible for the authenticator to confirm the requester's claimed identity and/or the requested service based on the voice and/or based on the face image.

The audio stream may be a real-time audio stream; the video stream may be a real-time video stream; and/or the 3D-data stream may be a real-time 3D-data stream. The video stream may consist of a time series of image frames. The 3D-data stream may consist of a time series of three-dimensional data. The three-dimensional data may be data defining a hologram or a point cloud. For example, the point cloud may define the three-dimensional surface of the requester's face. The authentication communication channel may be configured such that a real-time conversation is establishable between the authenticator and the requester. The authentication communication channel may be configured such that the at least one of the audio stream, the video stream and the 3D-data stream is transmittable bidirectionally between the end node device of the requester and the end node device of the authenticator.

The confirmation message may be generated with the end node device of the authenticator. Recording the confirmation message of the authenticator may comprise storing and/or analyzing an audio stream transmitted from the authenticator to the authentication system. The audio stream may be captured with a microphone of an end node device of the authenticator. Additionally or alternatively, data may be stored by the authentication system, wherein the data correspond to digits, which have been clicked by the authenticator on a keypad of the end node device of the authenticator. Additionally or alternatively, the authentication system may receive data, which have been transmitted by the end node device or an application of the end node device of the authenticator. For example, the authenticator may select a button of a graphical user interface displayed by an application running on the end node device of the authenticator by clicking the button with a pointer of a mouse. The end node device of the authenticator may register the clicking of the button and transmit corresponding data, which represent the confirmation message to the authentication system. For example, the confirmation message may contain information that the claimed identity of the requester is correct or not. Additionally or alternatively, the confirmation message may contain information that the requested service is approved or denied.

The confirmation message may be transmitted via the second communication channel. Alternatively, the confirmation message may be transmitted via a communication channel, which is different from the second communication channel.

The authentication system may further be configured to transmit data to the authenticator identifying the requested service and/or the claimed identity. For example, the authentication system may transmit audio data to the end node device of the authenticator, which represent a speech announcing to the authenticator the claimed identity and/or the requested service. Additionally or alternatively, the claimed identity and the requested service may be displayed on the end node device of the authenticator. Thereby, it is possible for the authenticator to compare the voice and/or face image of the requester with the claimed identity. Moreover, it is possible for the authenticator to discuss with the requester details of the requested service.

The plurality of contact data entries are stored on a storage device of the authentication system. The storage device may comprise one or more read-only memory (ROM) devices or one or more random access memory (RAM) devices. The contact data entries may be stored on a storage device, which is connected with a processor of the authentication system via a communication network. The storage device may comprise a plurality of sub-storage devices, which are located at different locations and are connected via a communication network, such as the Internet. The storage device may be represented by a cloud storage site.

Each of the contact data entries may represent a contact to an authenticator and/or a contact to a requester. Depending on the contact data entries, the first communication channel to the requester and/or the second communication channel to the authenticator of the requester is establishable. A contact data entry may be for example a phone number or a user address for a video over IP session. The authentication system may be configured to select a contact data entry of the end node device of the authenticator from among contact data entries, which correspond to persons, who are authorized and/or able to authenticate the claimed identity. The authentication system may comprise a data base, which assigns to each of the plurality of contact data entries for contacting authenticators, one or more identities, wherein the authenticator, who corresponds to the contact data entry is authorized and/or able to authenticate the assigned one or more claimed identities. The data base may be stored on the storage device.

Further criteria for selecting the contact data entry of the end node device of the authenticator may be applied, such as working experience, position or function within the organization of the authenticator.

The plurality of contact data entries may comprise a plurality of contact data entries, which correspond to a same authenticator. Additionally or alternatively, the plurality of contact data entries may comprise a plurality of contact data entries, which correspond to the requester.

The authentication system may further be configured to issue an authentication message depending on the information of the confirmation message, which has been received from the authenticator. The authentication message may be forwarded to a service provider. The authentication message may comprise information on whether or not the requested service is approved and/or the claimed identity of the requester is confirmed. The service provider may be configured to process the requested service in case the claimed identity and/or the requested service are confirmed.

According to a further embodiment, the authentication system is configured to receive a service request from a requesting end node device. The requesting end node device may be operated by the requester. Alternatively, the requesting end node device may be operated by a person, who is different from the requester and the authenticator. It is also conceivable that the requested service is transmitted or triggered from a system. For example an alarm may be triggered by a sensor sensing a dangerous condition. The requester may then be a person who is entitled to perform actions to eliminate the dangerous condition after the requester has been authenticated by the authenticator.

The authentication system may be configured to establish in response to the service request the first communication channel to the requester. Thereby, for example, the request and the claimed identity may be recorded via a communication channel, which is different from the first communication channel of the requester to which the first communication channel is established. A different communication channel may be provided by a different communication link, or a different end node device, and/or a different application software running on the end node device and which provides the functionality of the communication channel. Establishing the first communication channel may comprise selecting a contact data entry from a plurality of contact data entries of the requester depending on the claimed identity. The plurality of contact data entries of the requester may be stored on a storage device.

Accordingly, it is possible for the authentication system to establish the first communication channel such that a security level of the authentication communication channel meets a required criterion. Thereby, it is possible to increase the security of the authentication and confirmation process.

Establishing the first and/or second communication channel may comprise selecting a communication protocol and/or an encryption of the data transport via the respective communication channel. By way of example, the first communication channel may be established such that the requesting end node device is different from the end node device to which the authentication system connects via the first communication channel. Additionally or alternatively, the first communication channel may be established such that a communication protocol via which the service request and/or the claimed identity is transmitted to the authentication device is incompatible with a communication protocol of the first communication channel. Thereby, it is more difficult for an attacker to gain illegitimate access to services, since this would require the attacker to connect to two different end node devices of the requester or to connect to two mutually incompatible communication channels.

According to an embodiment, the storage device is configured to store a plurality of contact data entries of a plurality of authenticators, a plurality of identities of potential requesters and authorization data. For each of the plurality of authenticators, the authorization data may assign to the respective authenticator one or more of the identities of the potential requesters. The authorization data may be configured such that the respective authenticator is able and/or authorized to authenticate the one or more assigned identities. Additionally or alternatively, the authorization data may be configured such that there is a personal relationship between the respective authenticator and each of the one or more assigned identities. For each of the plurality of authenticators, the authorization data may define authorization roles and/or privileges to authenticate the assigned identities. For each of the plurality of authenticators, the authorization data may be a predefined authorization to authenticate the assigned identities.

According to a further embodiment, the selecting of the contact data entry comprises identifying one or more authenticators from a plurality of authenticators, wherein each of the identified authenticators is able and/or authorized to authenticate the claimed identity of the requester. Additionally or alternatively, the one or more authenticators may be identified from the plurality of authenticators depending on the requested service, depending on the claimed identity of the requester and/or depending on a security level of the authentication.

Identifying the one or more authenticators may comprise comparing the claimed identity of the requester with the identities of the potential requesters stored in the storage device. Identifying the one or more authenticators may comprise determining those authenticators from the plurality of authenticators, to whom the claimed identity of the requester is assigned by the authorization data.

According to an embodiment, the selecting of the contact data entry comprises identifying one or more authenticators from a plurality of authenticators, wherein for each of the identified authenticators, there is a personal relationship between the requester who requests the service and the respective identified authenticator.

According to a further embodiment, for each of the plurality of authenticators, the authorization data depend on personal relationships between the respective authenticator and the identities of the potential requesters and/or the authorization data depend on whether or not the respective authenticator is able and/or authorized to authenticate the identities of the potential requesters. The authorization data may assign an identity of a potential requester to an authenticator, when there is a personal relationship between the potential requester and the authenticator and/or when the authenticator is authorized and/or able to authenticate the potential requester.

According to a further embodiment, the authentication communication channel is configured such that the authentication communication channel allows the authenticator to at least one of listen to a voice of the requester and watch the face of the requester. The authentication communication channel may be configured such that the authentication communication channel allows a two-way conversation between the requester and the authenticator.

According to a further embodiment, the authentication system is configured to establish, in response to the requesting of the service, the first communication channel to the requester.

According to a further embodiment, the authentication system is configured to establish at least one of the first communication channel and the second communication channel such that a security level of the authentication communication channel meets a predefined security criterion.

Accordingly, it is possible to ensure a sufficiently high security level for the authentication and confirmation process. The establishing of the first and second communication channel may comprise selecting a contact data entry of the end node device of the requester and a contact data entry of the end node device of the authenticator from the plurality of contact data entries.

The security level of the authentication communication channel may be defined such that it is a measure for the security of the data transport through the authentication communication channel. Accordingly, the security level of the first and/or second communication channel may be defined such that it is a measure for the security of the data transport through the respective first and second communication channel.

The predefined security criterion may be a threshold value for the security level of the authentication communication channel. Additionally or alternatively, the security criterion may require that the security level of the authentication communication channel has to assume a maximum.

The security level of the authentication communication channel may be determined depending on at least one of the following: a communication protocol of the first and/or second communication channel, a type of the communication link, which forms part of the first communication channel, a type of the communication link, which forms part of the second communication channel, a type of the end node device of the requester and/or authenticator, an operating system of the end node device of the requester and/or authenticator, a location of the end node device of the requester and/or the end node device of the authenticator, whether or not the authentication system has waited a random delay time before contacting the end node device of the requester and/or the end node device of the authenticator, and an application running on the end node device of the requester and/or an application running on an end node device of the authenticator. The application may be an application, which is involved in managing data transmission via the authentication communication channel.

A type of the end node device may be one of a plurality of predefined types of end node devices. For example, the plurality of types of end node devices may be defined by grouping the end node devices into mobile telephones, wired telephones and computer devices. A type of the communication link may be one of a plurality of predefined types of communication links. By way of example, the predefined types of communication links may be defined by grouping the communication links into mobile phone communication links, wired telephone communication links and Internet communication links.

Furthermore, the security level of the authentication communication channel may depend on whether or not the authentication system waits a random delay time before establishing the first communication channel and the second communication channel. The security level of the authentication communication channel may depend on the random time range based on which the random delay time is determined.

The security level of the authentication communication channel may depend on the degree of complexity which is required for attacking the authentication communication channel. For example, the security level of the authentication communication channel may be high in case a communication protocol of the first communication channel is incompatible with a communication protocol of the second communication channel. Thereby, the security level of the authentication communication channel may depend on the communication protocol of the first communication channel and the communication protocol of the second communication channel. Additionally or alternatively, the security level of the authentication communication channel may depend on an encryption of the first communication channel and an encryption of the second communication channel. By way of example, the security level of the authentication communication channel may be high in case the encryption of the first communication channel is incompatible with an encryption of the second communication channel.

According to a further embodiment, the authentication system is configured to select at least one of a contact data entry of the end node device of the requester and the contact data entry of the end node device of the authenticator such that a security level of the authentication communication channel meets a predefined security criterion.

Accordingly, it is possible to ensure a sufficiently high security level for the authentication or confirmation process. The contact data entry of the end node device of the requester may be selected from the plurality of contact data entries stored on the storage device. By way of example, the contact data entry of the end node device of the requester and/or the contact data entry of the end node device of the authenticator may be chosen such that the communication protocol of the first communication channel and the communication protocol of the second communication channel are mutually incompatible. Thereby, it is more difficult for the attacker to gain access to the first communication channel and the second communication channel. Additionally or alternatively, the contact data entry of the end node device of the requester and/or the contact data entry of the end node device of the authenticator are selected such that a type of the end node device of the requester is different from a type of the end node device of the authenticator. According to a further embodiment, the authentication system is configured to implement a data transport on the first communication channel and/or a data transport on the second communication channel such that the security level of the authentication communication channel meets the predefined security criterion. Implementing the data transport may comprise selecting an encryption and/or a communication protocol for the data transport via the respective communication channel.

According to a further embodiment, the authentication system is configured to select the contact data entry of the end node device of the authenticator depending on the claimed identity. Selecting the contact data entry of the end node device of the authenticator depending on the claimed identity may comprise identifying one or more authenticators, who are able and/or authorized to authenticate the claimed identity.

The storage device may be configured to store a plurality of identities. Each of the plurality of identities may correspond to a potential requester. By way of example, an identity is a name of a person. The storage device may further be configured to store authorization data. The authorization data may assign to each of the authenticators, one or more of the identities. The respective authenticator may be able and/or authorized to authenticate the assigned identities via the authentication communication channel. The authorization data may comprise permissions, settings and/or statistics. The authorization data may depend on a personal relationship between the authenticator and the person, which is represented by the identity.

The authentication system may be configured to compare the claimed identity of the requester with the identities stored on the storage device and to identify those authenticators, which are able and/or authorized to authenticate the claimed identity. An authenticator may be able and/or authorized to authenticate a person, when there is a personal relationship between the authenticator and the person. Thereby, it is ensured that the authenticator can reliably authenticate the requester via the authentication communication channel.

The authentication system may comprise a data base, which is stored on the storage device, wherein the plurality of contact data entries of the authenticators, the plurality of identities and the authorization data are stored in the data base. Additionally, the contact data of the requesters may be stored in the data base.

According to a further embodiment, the authentication system is configured to establish at least one further communication channel to at least one further authenticator such that at least one of a further audio stream of the voice of the requester, a further video stream of the face of the requester, and a further 3D-data stream of the face of the requester is transmittable between the end node device of the requester and an end node device of the further authenticator.

The further communication channel may be established via the end node device of the further authenticator and a communication link between the authentication system and the end node device of the further authenticator. The authentication system may comprise an audio and/or video conferencing server. In particular, the authentication system may be configured to receive audio and/or video streams from the requester and/or the authenticator, and to select, which audio streams and/or video streams are transmitted to the requester and to the one or more authenticators.

The authentication system may be configured to establish an authentication communication channel between the requester, the authenticator and the one or more further authenticators. Alternatively, the authentication system may be configured to establish a further authentication communication channel at a later point in time between the requester and one or more of the further authenticators. Thereby, the further authenticator may confirm the claimed identity and/or the requested service. It is also conceivable that the authenticator confirms the claimed identity and the further authenticator confirms the requested service. Alternatively, the second authentication communication channel may be established between the authenticator and the further authenticator. Thereby, the further authenticator may confirm the identity of the authenticator.

According to a further embodiment, the authentication system is configured to determine a number of the at least one further authenticator such that a security level of the authentication meets a predefined authentication security criterion.

The security level of the authentication may be defined as a measure for a burden for an attacker to gain illegitimate access to the service. By way of example, in case the requested service requires a high security level, the authentication system may set the number of the at least one further authenticator to three. On the other hand, in case the requested service requires a low security level, the authentication system may set the number of the at least one further authenticator to zero.

The predefined authentication security criterion may be a threshold value for the security level of the authentication process. Additionally or alternatively, the authentication security criterion may require that the security level of the authentication process has to assume a maximum.

According to a further embodiment, the authentication system is configured to analyze the at least one of the audio stream, the video stream and the 3D-data stream to extract characteristics, which correspond to at least one of the requester, the authenticator and a combination of the requester and the authenticator.

The authentication system may be configured to apply a voice recognition algorithm to the audio stream transmitted between the end node device of the requester and the end node device of the authenticator. Additionally or alternatively, the authentication system may be configured to apply a face recognition algorithm to the video stream and/or the 3D-data stream transmitted between the end node device of the authenticator and the end node device of the requester. The authentication system may be configured as an artificial intelligence system, which performs the voice and/or face recognition. The authentication system may further apply a checksum algorithm to check, whether the voice of the requester and the voice of the authenticator are simulated by a same recording.

The voice recognition algorithm may be configured to extract voice patterns, such as the height of the voice, a dialect, or words, which are spoken. Furthermore, a conversation recognition algorithm may be applied to the audio stream and/or video stream to identify characteristics of the conversation between the requester and the authenticator, such as words spoken, lengths of statements and times between successive statements. The authentication system may be configured to determine, whether a two-way conversation takes place between the authenticator and the requester. A two-way conversation may be defined as a communication between two parties, which comprises statements from each of the party. By way of example, the voice recognition algorithm may be configured to determine, whether the audio stream represents voices of two different persons. Since the first communication channel and the second communication channel are connected to different ports of the authentication system, it is possible to determine, whether a voice and/or audio stream is transmitted from the end node device of the requester.

According to a further embodiment, the authentication communication channel is configured such that an audio stream is transmittable between the end node device of the authenticator and the end node device of the requester; wherein the authentication system further comprises a filter, which is configured to check the audio stream for a two-way conversation between the requester and the authenticator.

Accordingly, it is possible to check, whether the authenticator confirms the claimed identity of the requester after an actual conversation between the requester and the authenticator has taken place. Thereby, the security level ensured by the authentication is further increased.

According to a further embodiment, the authentication system is configured to assign each of the first communication channel and the second communication channel to one of a group of predefined security classes; and to determine a security level of the authentication communication channel, wherein the security level of the authentication communication channel depends on whether or not the security class of the first communication channel and the security class of the second communication channel are different.

Accordingly, it is possible to increase a security level of the authentication by providing an authentication communication channel, which combines different technologies.

The group of security classes may be predefined. Each security class may be defined depending on the communication channel and/or a data transport via the communication channel. The data transport may comprise a communication protocol of the communication channel and/or an encryption for communicating via the communication channel. The communication channel may comprise a communication link, an end node device, an operating system of the end node device and an application running on the end node device, wherein the application is involved in the data transport via the communication channel.

Each security class may correspond to a different type of communication protocol, a different type of end node device, a different type of application running on the end node device and/or a different type of communication link. The types may be predefined. By way of example, types of end node devices are mobile phones, wired phones and computers. Furthermore, by way of example, types of communication links are wired phone networks, mobile phone networks and the Internet.

The first communication channel is assigned to a security class of the group of security classes, wherein the class of the first communication channel corresponds to a first communication protocol. Accordingly, the second communication channel is assigned to a security class of the group of security classes. In case the security class of the first communication channel is different from the security class of the second communication channel, the security level is higher than in case the security class of the first communication channel is identical to the security class of the second communication channel. Thereby the security level of the authentication communication channel depends on whether or not the security class of the first communication channel is identical to the security class of the second communication channel.

According to a further embodiment, the authentication system is configured to assign each of the first communication channel and the second communication channel to one of a group of predefined security classes, wherein the security level of the authentication communication channel depends on a combination of the security class of the first communication channel and the security class of the second communication.

For example, the security level of the authentication communication channel depends on how much the security class of the first communication channel is incompatible with the class of the second communication channel. Thereby, the combination of the security class of the first communication channel and the security class of the second communication channel represents a degree of incompatibility.

According to a further embodiment, the authentication system is configured to establish the first communication channel, wherein the establishing of the first communication channel comprises waiting a first random delay time before contacting the end node device of the requester; and/or wherein the establishing of the second communication channel comprises waiting a second random delay time before contacting the end node device of the authenticator. The first random delay time and/or the second random delay time may be after the recording of the claimed identity and the requested service and before the establishing of the respective first and second communication channel.

Accordingly, it is possible to ensure a high security level for the authentication communication channel, since it is not possible for the attacker to predict the time when the first and the second communication channel are established.

The first random delay time and/or the second random delay time may be defined as a time, which depends on a random number. The random number may be generated by the authentication system. The first random delay time and the second random delay time may depend on the same random number. Alternatively, the first random delay time and the second random delay time may depend on different random numbers. The first and/or second random number may be generated based on a random number range. An increased random number range may lead to an increased security level of the authentication communication channel.

According to a further embodiment, the authentication system is configured to establish the first communication channel depending on the claimed identity, wherein the establishing of the first communication channel comprises randomly selecting the contact data entry of the end node device of the requester from a first subset of the plurality of contact data entries; and/or wherein the establishing of the second communication channel comprises randomly selecting a contact data entry of the end node device of the authenticator from a second subset of the plurality of contact data entries. The first subset may comprise contact data entries of requesters and the second subset may comprise contact data entries of authenticators.

In other words, the contact data entry of the end node device of the authenticator and/or the end node device of the requester is selected by applying a random algorithm to a respective subset of the contact data entries, which are stored in the storage device. Accordingly, it is possible to avert attacks more efficiently. In particular, in case of a man-in-the-middle attack, it is not possible for the attacker to predict, which person will serve as the authenticator for authenticating the service.

The authentication system may further be configured to determine the first and/or second subsets of contact data entries from the plurality of contact data entries. By way of example, the second subset may comprise contact data values, of authenticators which personally know the requester and/or which are able and/or authorized to authenticate the requester. Furthermore, the first subset may comprise those contact data entries from the plurality of contact data entries, which correspond to the claimed identity. For example, the first subset comprises a landline telephone number, a mobile telephone number and a user address for a voice over IP or video over IP session, each of which corresponding to the claimed identity.

According to a further embodiment, the authentication system is configured to randomly select a selection algorithm from a plurality of selection algorithms, each of which configured to perform at least one of the selecting of a contact data entry of the end node device of the authenticator and a selecting of a contact data entry of the end node device of the requester.

According to a further embodiment, the authentication system is further configured to transmit a message to at least one of an end node device of a further person and a further system informing the at least one of the further person and the further system of the requested service.

Accordingly, it is possible to enable the further persons or the further systems to send messages to the authentication system to object to the service request. The authentication system may be configured to wait a predetermined or predeterminable time for receiving confirmation or objection messages from the at least one of the further person and the further system.

According to a further embodiment, the authentication system is configured to determine a forwarding delay time such that a security level of the authentication meets a predefined authentication security criterion; and to forward the requested service after the forwarding delay time has passed from the receiving of the confirmation message.

Accordingly, since there is a forwarding delay between the receiving of the confirmation message and the forwarding of the requested service, it is possible for the authenticator to withdraw his confirmation at a later time, even when he initially has confirmed the claimed identity or the requested service. The authentication system may be configured to increase the forwarding delay time with an increased desired security level. The forwarding delay time may depend on a randomly generated number. The action delay time may depend on further factors, which may limit the duration of the forwarding delay time, such as urgency of action or priority.

Embodiments provide a method of authenticating a requester requesting a service using an authentication system; the method comprising: establishing a first communication channel via an end node device of the requester and a communication link between a first port of the authentication system and the end node device of the requester; recording an identity claimed by the requester and a service requested by the requester; selecting from a plurality of contact data entries stored on a storage device of the authentication system a contact data entry of an end node device of an authenticator; establishing a second communication channel via the end node device of the authenticator and a communication link between a second port of the authentication system and the end node device of the authenticator depending on the selected contact data entry; establishing via the first and the second port an authentication communication channel comprising the first communication channel and the second communication channel such that at least one of an audio stream of a voice of the requester, a video stream of a face of the requester and a 3D-data stream of the face of the requester is transmittable between the end node device of the requester and the end node device of the authenticator; and recording a confirmation message of the authenticator, wherein the confirmation message confirms or rejects at least one of the claimed identity and the requested service.

According to a further embodiment, the method comprises storing on a storage device a plurality of contact data entries of a plurality of authenticators, a plurality of identities of potential requesters and authorization data. The authorization data may assign to each of the plurality of authenticators one or more of the identities, which the respective authenticator is able and/or authorized to authenticate. Additionally or alternatively, the authorization data may assign to each of the plurality of authenticators one or more identities, wherein there is a personal relationship between the respective authenticator and each of the one or more assigned identities.

According to a further embodiment, the method comprises establishing the first communication channel via the end node device of the requester and the communication link between the first port of the authentication system and the end node device of the requester.

According to a further embodiment, the establishing of the first communication channel is performed by the authentication system in response to the requesting of the service.

According to a further embodiment, the establishing of the first communication channel and the establishing of the second communication channel are performed such that a security level of the authentication communication channel meets a predefined security criterion.

Embodiments provide a machine-readable medium or a computer program product. The machine readable medium or the computer program product may have stored thereon a program code, which, when loaded and executed in a computer system or a processor, is adapted to perform the method according any one of the previously described embodiments.

BRIEF DESCRIPTION OF THE DRAWINGS

The foregoing as well as other advantageous features are more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

Figure 1:
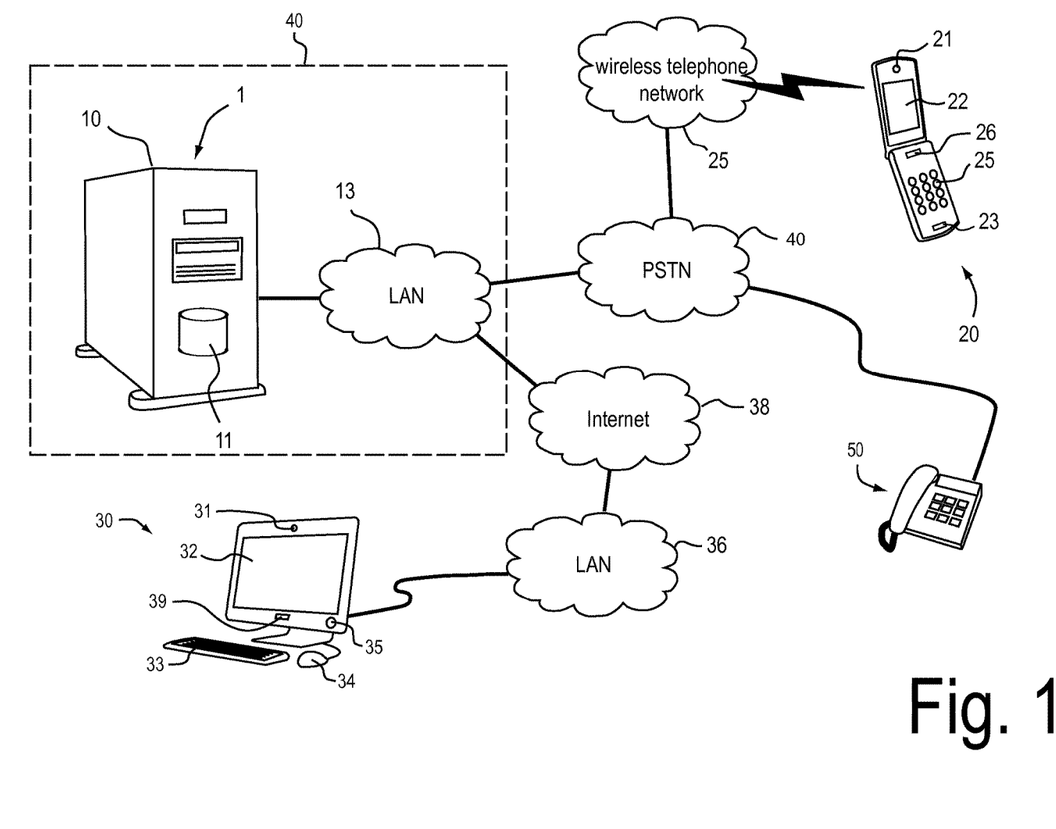
FIG. 1 is a schematic illustration of an authentication system according to an exemplary embodiment.

FIG. 1 is a schematic illustration of an authentication system 1 and the various communication channels, which are managed by the authentication system 1 according to an exemplary embodiment. The authentication system 1 is installed in a bank service center 40.

A requester, who wishes to access a service offered by the bank service center 40, calls the bank service center 40 with a requesting end node device, such as a mobile telephone. The requested service may be, for example, a bank transaction. The call is routed through a local area network 13 of the bank service center 40 to the authentication system 1, which performs an authentication of the requester. After the requester is authenticated, the service request is forwarded to a bank service provider system (not shown in FIG. 1) of the bank service center 40.

When the requester is connected to the authentication system 1, the authentication system 1 records a service request and an identity claimed by the requester. Then, the authentication system 1 establishes a first communication channel between a first port (not shown in FIG. 1) of the authentication system 1 and an end node device 20 of the requester. Also, the authentication system 1 establishes a second communication channel between a second port (not shown in FIG. 1) of the authentication system 1 and an end node device 30 of an authenticator. A portion of the first communication channel is established within a wireless telephone network 25, within the public switched telephone network 40, and within the local area network 13 of the service center 40. A portion of the second communication channel is established within the Internet 38.

Alternatively, the first communication channel may be established when the requester calls the bank service center 40 to gain access to the service. Then, via the first communication channel, the requester may transmit the claimed identity and the service request to the authentication system 1.

The authentication system 1 then combines or merges the first communication channel and the second communication channel such that an authentication communication channel is established between the end node device 20 of the requester and the end node device 30 of the authenticator. The authentication communication channel comprises the first communication channel and the second communication channel, the first and the second port. The authentication communication channel is configured such that at least one of an audio stream of a voice of the requester, a video stream of a face of the requester and a 3D-data stream of the face of the requester is transmittable between the end node device of the requester 20 and the end node device of the authenticator 30. Thereby, the authenticator can communicate with the requester and at the same time can see the face of the requester displayed on the display 32 of the end node device 30 of the authenticator. This allows the authenticator to authenticate the requester by listening to the voice of the requester and/or by watching the requester's face image. The authenticator may be selected by the authentication system 1 such that the authenticator is a person, who is part of the requester's life and/or such that the authenticator is able and/or authorized to authenticate the requester. Thereby, by talking to the requester and/or watching the face of the requester, it is possible for the authenticator to authenticate the requester. Thereby, the security level of the authentication is not limited by deficiencies of biometric sensors.

The authentication system 1 then requests the authenticator to transmit a confirmation message to the authentication system 1. The authenticator confirms or rejects the identity of the requester by using a keyboard 33 or a computer mouse 34 of the end node device 30 of the authenticator, or by giving a voice command, which is recorded by the microphone 39 of the end node device 30. The confirmation message confirms or rejects the claimed identity and/or the requested service. The confirmation message is recorded by the authentication system 1, for example by storing information contained in the confirmation message on a storage device 11 of a computer system 10 of the authentication system 1.

The authentication system 1 comprises a storage device 11, on which a plurality of contact data entries are stored. A contact data entry may for example be a telephone number or a user address for a voice over IP session or a video over IP session. The authentication system 1 selects contact data entries from the plurality of stored contact data entries for establishing the first communication channel and/or the second communication channel. For example, the authentication system may select the contact data entry of the end node device of the requester by selecting a contact data entry from those contact data entries, which correspond to a person having the claimed identity. Furthermore, the contact data entry of the end node device of the authenticator may be selected from the contact data entries, which correspond to authenticators who personally know the person having the claimed identity.

The end node device 30 of the authenticator comprises a digital video camera 31, a microphone 39, a display 32 and a speaker 35. This allows to establish a video over IP session between the authentication system 1 and the end node device 30 of the authenticator. Also, the end node device 20 of the requester comprises a digital video camera 21, which is configured to capture a real-time video image of the face of the requester. The mobile telephone 20 further comprises a display 22, a microphone 23 and a speaker 26. Thereby, it is possible for the authentication system 1 to establish a video call or a video conference between the end node device 20 of the requester and the end node device 30 of the authenticator.

The end node device 30 of the authenticator is not limited to the computer system, as shown in FIG. 1, but may be any end node device, which is suitable for receiving audio and/or video streams forwarded from the authentication system 1 and to acquire audio data and/or video image data for transmitting corresponding audio and/or video streams to the authentication system 1.

The authentication system 1 is configured to determine a security level of the authentication communication channel before the first and the second communication channel are established. Thereby, it is possible for the authentication system 1 to determine, whether the security level of the authentication communication channel meets a security criterion. By way of example, the authentication system 1 may determine, whether the security level of the authentication communication channel exceeds a predetermined threshold value.

The security level of the authentication communication channel may depend on the degree of complexity, which is required to launch a successful attack.

Depending on the security criterion, the authentication system 1 may establish a further communication channel to an end node device 50 of a further authenticator. In the example, shown in FIG. 1, the end node device 50 of the further authenticator is a wired telephone device. A portion of the further communication channel is established within a public switched telephone network 40. The further communication channel is connected to a third port of the authentication system 1. The authentication system 1 is configured such that a communication channel is establishable between the first port and the third port. Thereby, it is possible for the further authenticator to authenticate the requester based on an audio telephone communication between the requester and the further authenticator. Additionally or alternatively, the further authenticator may authenticate the first authenticator who uses the end node device 30 of the first authenticator, after a communication channel is established by the authentication system 1 between the second and the third port. Additionally or alternatively, the first authenticator may confirm the claimed identity of the requester and the second authenticator may confirm the requested service.

The end node device 50 of the further authenticator is not limited to the wired telephone device, as shown in FIG. 1, but may be any end node device, which is suitable to receive audio and/or video streams forwarded from the authentication system 1, to acquire audio data and/or video image data for transmitting corresponding audio and/or video streams to the authentication system 1.

The authentication system 1 may be configured to establish communication channels to a number of end node devices of authenticators. A higher number of authenticators increases the authentication security level.

The authentication system 1 may comprise a conference bridge (not shown in FIG. 1), which is configured to establish the required communication channels between the various ports of the authentication system 1. It is also conceivable that the authentication system comprises a plurality of conference bridges, which are connected to form a cluster. Thereby, is it possible to balance the load generated by a plurality of authenticators.

It is also conceivable that the authentication system 1 deals with services different from bank services. By way of example, the authentication system 1 may be configured to handle alarms, which are triggered by persons or sensors, which detect a dangerous condition. The alarm message is transmitted to the authentication system 1. The authentication system 1 contacts a person (requester in the example above), who is entitled to determine which action is to be taken to eliminate the dangerous condition after having been authenticated by an authenticator.

Figure 2:
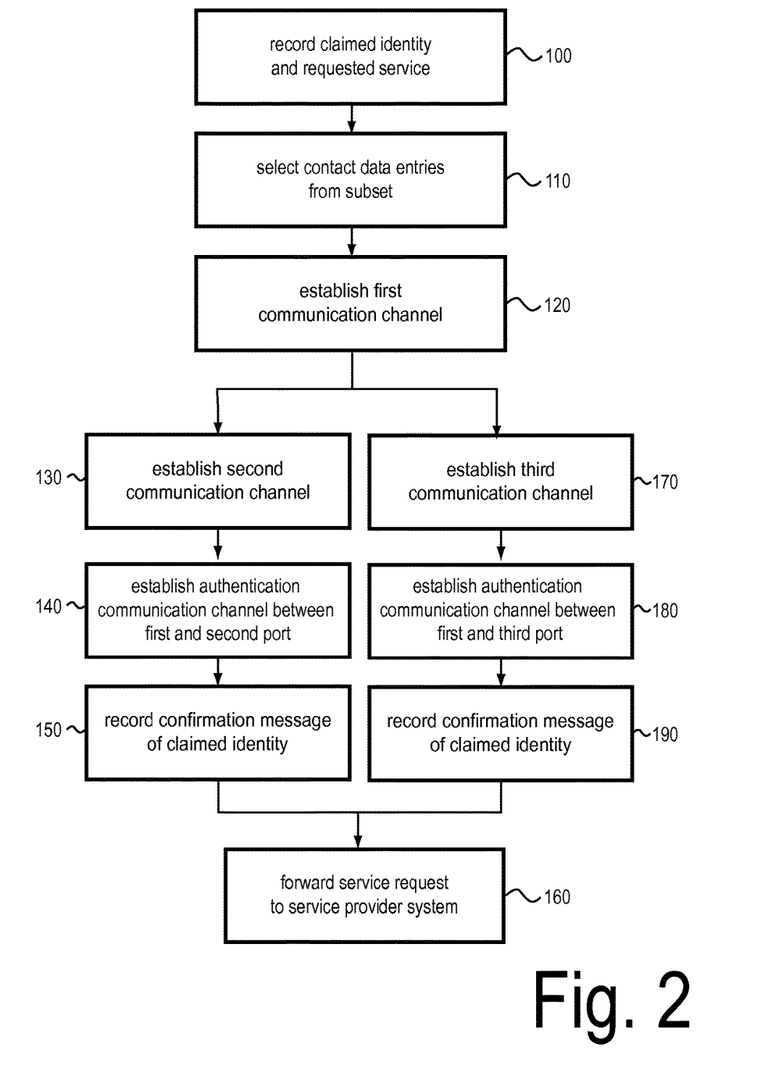
FIG. 2 is a flow-chart illustrating the operation of the authentication system, which shown in FIG. 1.

FIG. 2 is a flow chart illustrating an exemplary authentication process, which is performed by the authentication system 1, as shown in FIG. 1. After the requester has established a connection to the authentication system, the authentication system records 100 an identity claimed by the requester and a service requested by the requester. The authentication system selects a first subset of a plurality of contact data entries, wherein each contact data entry of the first subset corresponds to the claimed identity. The authentication system selects a first contact data entry from the first subset to contact the requester by establishing 120 a first communication channel.

The authentication system further selects a second subset from the plurality of contact data entries. Each contact data entry of the second subset corresponds to one of a group of authenticators, who personally know the requester. Additionally or alternatively, the second subset may comprise a plurality of contact data entries, which correspond to a same authenticator, but which represent communication channels which are at least partially located in different networks or which represent communication channels to physically different end node devices.

Then, the authentication system selects 110 a second contact data entry from the second subset. The authentication system is configured to select the first contact data entry and the second contact data entry such that the security level of the authentication communication channel, which will be established depending on the selected first and second contact data entry, meets a predefined security criterion.

Depending on the predefined security criterion, a number of contact data entries of authenticators, which will be contacted in order to authenticate the requester are selected. In the example shown in FIG. 2, the number of authenticators is two, however, it may also be one or any other number. Alternatively, the number may be a fixed number for all services provided by the service center.

Then, a second communication channel to a first authenticator is established 130 between a second port of the authentication system and an end node device of the first authenticator. Via the second communication channel, the first authenticator may authenticate his identity, for example by providing a password or by an authentication token, which is read by the end node device of the authenticator. Then, the authentication system establishes 140 an authentication communication channel via the first and the second port. This allows the first authenticator to communicate with the requester via audio and/or video. Then, a message is transmitted from the end node device of the first authenticator to the authentication system, as to whether or not the first authenticator confirms the claimed identity of the requester. The confirmation message is received 150 and stored by the authentication system.

Simultaneously or successively to the establishing 120, 130 of the first and/or second communication channel, the establishing 140 of the communication channel between the first and the second port and the receiving 150 of the confirmation message, the corresponding procedure for the authentication by the second authenticator may be performed. This corresponding procedure comprises an establishing 170 of a third communication channel between a third port of the authentication system and an end node device of the second authenticator, an establishing 180 of a communication channel between the first port and the third port, whereby the requester can communicate with the second authenticator via audio and/or video, and a receiving 190 of a confirmation message of the second authenticator.

The authentication system may further be configured such that in case any one of the first and the second authentication channel is establishable (e.g. since the respective authenticator is not available), the authentication system selects further contact data entries from the plurality of contact data entries for contacting one or more further authenticators.

The authentication system may further be configured to send status updates to the requester informing him about the status of the authentication. The status updates may be sent after a random delay time has passed from the point of time of the corresponding status changes. Thereby, it is more difficult for a possible attacker to predict the point of time, when the communication channel to the one or more authenticators are established.

The authentication system may be configured to analyze the audio and/or video streams transmitted between the end node device of the requester and the end node device of the authenticator. For example, the authentication system may be configured to determine, whether there is a mutual communication between the requester and the authenticator. The authentication system may analyze the audio streams to check whether the communication comprises verbal statements of both the authenticator and the requester. Furthermore, the authentication system may be configured to analyze the reaction times between successive verbal statements to determine, whether the transmitted audio streams represent a real-time communication rather than played recordings. The analysis of the audio and/or video streams may be performed in real-time. Additionally or alternatively, the audio and/or video streams may be recorded and the analysis is performed at a later point in time. The analysis may also comprise analyzing the video streams, to detect voice manipulation filters.

The authentication system may further be configured to present to the requester information about the service requested. For example, the authenticator may see on the display 32 (shown in FIG. 1) the transaction amount and the recipient of the bank transaction.

The authenticator may inform the authentication system that the authenticator does not personally know the requester. Then, the authentication system will select a further contact data entry from the subset of contact data entries for contacting a further authenticator.

When each of the confirmation messages of the first and the second authenticators are positive, the service request is forwarded 160 to the service provider system.

The authentication system may further be configured such that before the service request is forwarded 160 to the service provider system, messages to further persons are transmitted, wherein each of the messages contains information about the service request. The information contained in the messages may depend on the desired security level. The authentication system may be configured such that the messages do not have to be confirmed for forwarding the message to the service provider. The authentication system may be configured to reject the service request, in case a message from any one of the persons is received, which contains a disapproval of the service request. The authentication system may be configured to wait a delay time within which a disapproval from the further persons can be received. The delay time may depend on the desired security level.

Figure 3:
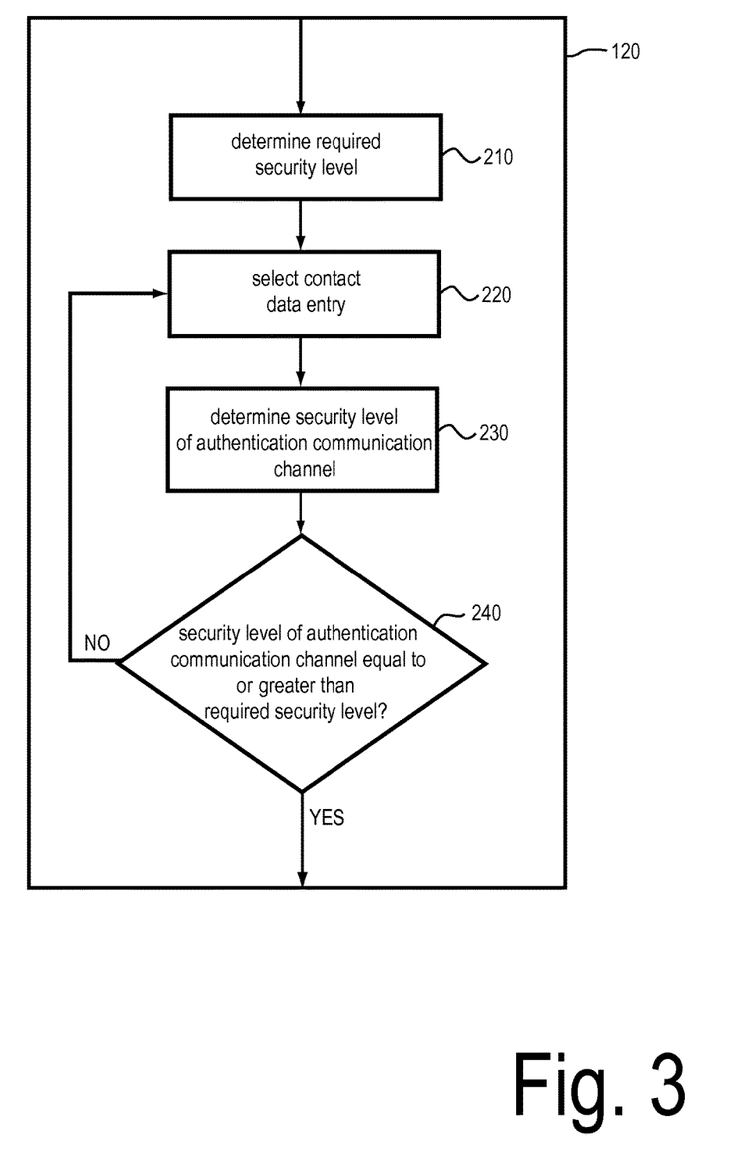
FIG. 3 is a flow chart illustrating an exemplary manner of determining the contact data entries of the authenticators for authenticating the requester.

FIG. 3 is a flow chart illustrating an algorithm for selecting 120 the contact data entries of the one or more authenticators from the subset of contact data entries. The algorithm shown in FIG. 3 may be performed by the authentication system 1 (shown in FIG. 1). The algorithm, shown in FIG. 3 is started after the determining 110 (shown in FIG. 2) of the subset of contact data entries of the authenticators and before the establishing 130, 170 (shown in FIG. 2) of the one or more communication channels to the authenticators.

The authentication system determines 210 a desired security level for the authentication process. The desired security level may be determined depending on the requested service and/or the claimed identity of the requester.

By way of example, the desired security level ds may be determined according to the following equation $$ds = us \cdot si,$$

wherein us denotes a user security level and si denotes a service importance. It is also conceivable that the desired security level depends on additional factors.

The user security level us may be determined depending on the claimed identity. For example, the authentication system may perform an initial authentication of the requester. The initial authentication may be based on voice recognition techniques, face recognition techniques or other biometric recognition techniques. The user security level us may then be determined depending on the degree of uncertainty involved in this initial authentication. Additionally or alternatively, potential requesters may be grouped into groups of different user security levels. By way of example, a high user security level us may be assigned to service requests, when the claimed identity corresponds to a client, who wants to have a high security level for all its transactions.

The service importance si may depend on the potential damage, which may be caused by a successful attack. By way of example, a small transaction amount of a bank transaction may result in a comparatively low service importance si. By way of example, both the user security level us and the service importance si are positive values of between 0 and 10.

Depending on the determined desired security level ds, one or more contact data entries of one or more authenticators are determined. A high desired security level ds may result in selecting contact data entries, which correspond to a communication channel having a high communication channel security level and/or may result in a high number of different authenticators.

In the exemplary method illustrated in FIG. 3, a first contact data entry is selected 220 from the subset of contact data entries. The first contact data entry may be selected depending on the desired security level ds. For example, in case the desired security level ds has a high value, a contact data entry may be selected, which corresponds a high communication channel security level of the corresponding authenticator.

Then, a security level of the authentication communication channel is determined 230 based on the selected first contact data entry. In case the security level of the authentication communication channel is equal to or greater than the desired security level (YES in 240), the method proceeds with establishing (130 in FIG. 2) a communication channel to the authenticator of the selected contact data entry. In case the security level of the authentication communication channel is smaller than the desired security level (NO in 240), a second contact data entry is selected 220 from the subset of contact data entries. Hence, at least two authenticators will be contacted for authenticating the requester. Based on the selected first and second contact data entries, a determining 230 of the security level of the authentication communication channel is again performed depending on the selected first and second contact data entries.

The security level of the authentication communication channel may be determined depending on a security level of the communication channel to the requester and a security level of the communication channels to the authenticators. In case more than one contact data entry of an authenticator has been selected so far, the security level of the authentication communication channel may additionally or alternatively be determined depending on a number of the contact data entries, which have been selected so far.

The security level of the authentication communication channel may depend on at least one of the following: the number of contact data entries, selected so far, a line difference factor and locations of end node devices corresponding to the contact data entries, selected so far.

By way of example, the security level of the authentication communication channel may be determined according to the following equation $$as = ld \cdot \sum_{i=1}^{N} cs_i \cdot d_i wf_i \cdot bf_i$$

wherein N denotes the number of communication channels, including the first communication channel to the requester, and the second to Nth communication channels to the authenticators. ld denotes a line difference factor and $d_i$ denotes the location distance between the end node device of the authenticator and the end node device of the requester; wherein for N=1 (i.e. the requester) the location distance is set to 1. $cs_i$ denotes the security level of the ith communication channel. $wf_i$ denotes a white list factor of the ith communication channel and $bf_i$ denotes a black list factor of the ith communication channel.

The security level of the communication channel may depend on a security level of the end node device, a security level of the communication link between the end node device and the authentication system and/or a security level of an application or operating system running on the end node device. For example, the security level of the communication channel is calculated by multiplying the security level of the end node device with the security level of the communication link. The security level of the communication channel may depend on the number of contact data entries which are stored on the storage device for the respective authenticator, who is called to authenticate the requester. A call diversion to an authenticator's end node device may lead to a low security level of the communication channel.

The white list factor $wf_i$ yields a high security level of the authentication communication channel in case a parameter related to the ith communication channel considers the ith communication channel as secure. The black list factor $bf_i$ yields a low security level in case a parameter related to the ith communication channel considers the ith communication channel as insecure.

The location distance $d_i$ may for example be indicative, of whether the end node device of the requester and the end node device of the authenticator are both located substantially at a same location. End node devices, which are located substantially at a same location involve a high security risk, since it is possible that they are both operated by a same person.

It is also conceivable that the security level of the authentication communication channel depends on additional factors. The process of how to determine the line difference factor is explained with reference to FIG. 4.

After having determined 230 again the security level of the authentication communication channel, the security level of the authentication communication channel is again compared to the desired security level. In case the authentication security level is smaller than the desired security level (i.e. NO in 240), a further contact data entry is selected 220 from the subset of contact data entries. In case the authentication level is equal to or greater than the desired security level (i.e. YES in 240), the method proceeds with establishing (130, 170 in FIG. 2) the communication channels to each of authenticators using the selected contact data entries.

Before the authentication system starts to establish the communication channels to the authenticators, the authentication system waits a call delay time. The call delay time may be determined such that the precise time of establishing a communication channel is difficult to predict for a possible attacker. The call delay time may be randomly generated or depend on a randomly generated number. The call delay time may depend on at least one of the following: an action security, an action-threat-level, user settings for calculating the call delay time, and a random number generated for calculating the call delay time.

For example, the call delay time cd may be determined according to the following equation $$cd = si \cdot tl \cdot us \cdot r_{cd},$$

wherein si denotes the service importance, tl denotes the threat-level, us denotes user settings for calculating the call delay time, and $r_{CD}$ denotes the randomly generated number for calculating the call delay time. It is also conceivable that the call delay time depends on additional factors.

The threat level tl is raised in case the authentication system gets aware of potential risks, which are independent from the pending service request. For example, a suspiciously high number of recent attacks may cause an increased threat level.

In order to further increase the security of the service provided, the authentication system may be configured to wait an action delay time after positive confirmation messages have been received from each of the authenticators and before forwarding the service request to the service provider system. The action delay time may be randomly generated or depend on a randomly generated number. The action delay time may depend on at least one of the following: the authentication security level, the action-threat level, user settings for calculating the call delay time, and a random number, generated for calculating the action delay time.

By way of example, the action delay time ad may be determined according to the following equation $$ad = si \cdot tl \cdot us \cdot r_{ad},$$

wherein si denotes the service importance, tl denotes the threat-level, us denotes the user settings for calculating the action delay time, and $r_{ad}$ denotes the randomly generated number for calculating the action delay time. It is also conceivable that the action delay time depends on additional factors.

The method, which is illustrated in the flow chart of FIG. 3 together with the equations, as given above, represents an algorithm for determining 120 one or more contact data entries from the subset of contact data entries. The authentication system may be configured to randomly change the algorithm for determining 120 the one or more contact data entries. Thereby, it is more difficult for an attacker to predict, which authenticators will be contacted by the authentication system. Additionally or alternatively, the algorithm for determining 120 the one or more contact data entries may itself involve a random selection of the contact data entries of the authenticators.

Figure 4:
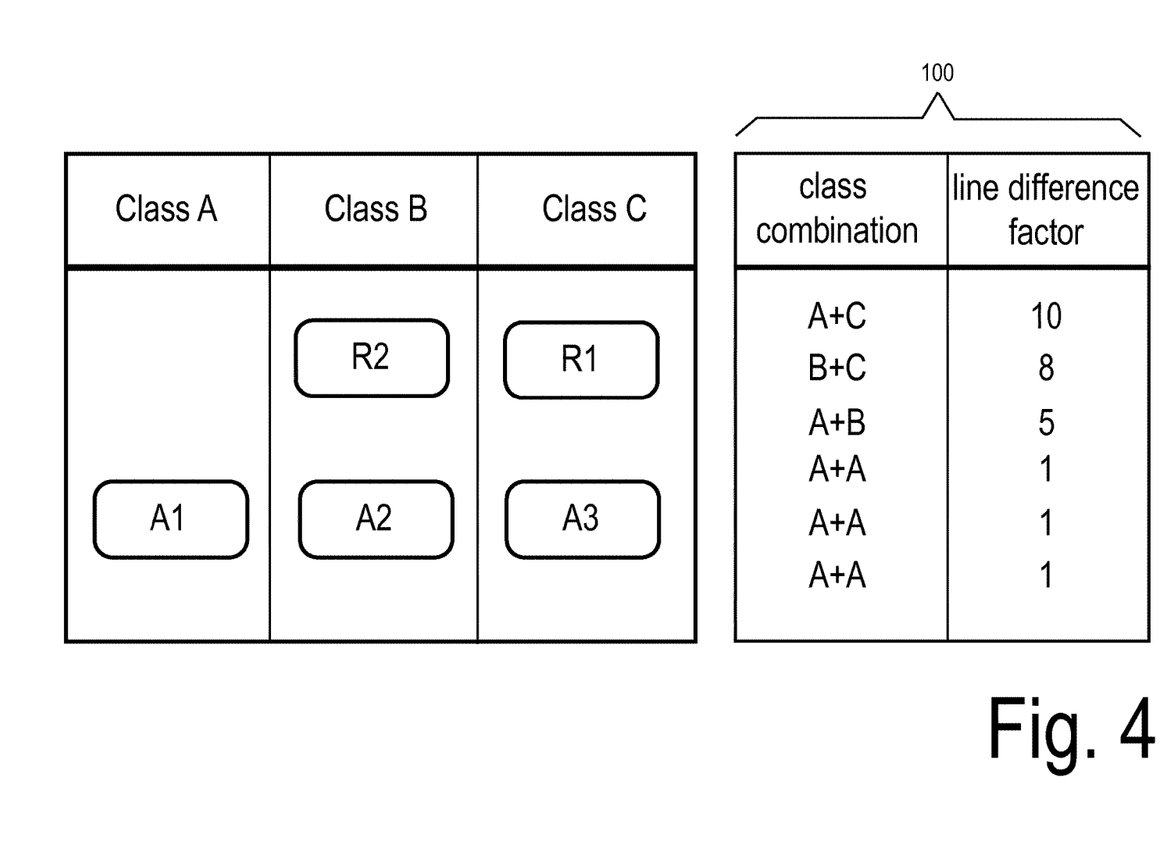
FIG. 4 is a schematic illustration of how an authentication security level is determined based on predefined security classes.

FIG. 4 schematically illustrates, how the contact data entry of the end node device of the requester and the contact data entry of the end node device of the authenticator are selected based on predefined security classes. In the example shown in FIG. 4, the security classes represent mutually different communication protocols or mutually different types of communication protocols.

In the example, shown in FIG. 4, the authentication system 1 (shown in FIG. 1) is configured to assign a communication channel to one of a group of security classes. The group of security classes comprises class A class B and class C. By way of example, each of the security classes represents an encrypted or non-encrypted communication protocol. In the example, which is shown in FIG. 4, the plurality of contact data entries comprises contact data entries R1 and R2 of the requester and contact data entries A1, A2 and A3 of three authenticators. Each of these three authenticators know the requester personally and are therefore authorized and/or able to authenticate the requester. Each of the contact data entries represents a communication channel.

The authentication system assigns contact data entries R1 and A3 to security class C, contact data entries R2 and A2 to security class B and contact data entry A1 to security class A. On the storage device of the authentication system, there is further stored a table 100, which assigns each combination of classes to a line difference factor. The authentication system is further configured to calculate the security level of the authentication communication channel depending on the line difference factor. The security level of the authentication communication channel may increase with increasing line difference factor. Alternatively, the line difference factor is the security level of the authentication communication channel.

In the example shown in FIG. 4, the authentication system prefers a combination of a communication channel, which was assigned to class A with a communication channel which was assigned to class C, since the communication protocol which is represented by class A is highly incompatible with the communication protocol which is represented by class C. On the other hand, a combination of a communication channel, which was assigned to class A and a communication channel, which was assigned to class B is less preferred, since the communication protocol of class B is a higher version of the communication protocol of class A.

Therefore, the authentication channel chooses contact data entry R1 to contact the requester and contact data entry A1 to contact the authenticator. Thereby, a high security level for the authentication communication channel is achieved.

The authentication system may be configured to dynamically adapt the above given formulas for calculating the desired security level, the security level of the authentication communication channel, the call delay time and the action delay time. Dynamically adapting a formula may comprise adapting parameters, adding parameters or removing parameters. Thereby, it is possible to ensure an even higher security level of the authentication even more.

What is claimed is:

1. An authentication system for authenticating a human requester requesting a service, the authentication system comprising:
    a first port, configured such that a first communication channel is establishable via an end node device of the requester and a communication link between the first port and the end node device of the requester;
    a second port, configured such that a second communication channel is establishable via an end node device of a human authenticator and a communication link between the second port and the end node device of the authenticator; and
    a storage device configured to store a plurality of contact data entries;
    wherein the authentication system is configured
    to record an identity claimed by the requester;
    to select from the plurality of contact data entries a contact data entry of the end node device of the authenticator depending on the claimed identity;
    to establish the second communication channel depending on the selected contact data entry;
    to establish via the first and the second port an authentication communication channel comprising the first communication channel and the second communication channel such that at least one of a real-time audio stream of a voice of the requester, and a real-time video stream of a face of the requester and/or a 3D-data stream of the face of the requester is transmittable between the end node device of the requester and the end node device of the authenticator;
    wherein the authentication communication channel is further configured to allow the authenticator, by using the end node device of the authenticator, to listen to the voice of the requestor that has been captured by the end node device of the requestor and to allow a real-time two-way conversation between the requester and the authenticator via the authentication communication channel; and
    wherein the authentication system is further configured to record a confirmation message of the authenticator, wherein the confirmation message confirms or rejects at least one of the claimed identity and the requested service.

2. The authentication system of claim 1, wherein the authentication communication channel is configured such that the authentication communication channel allows the authenticator, by using the end node device of the authenticator, to watch an image of the face of the requester that has been captured by the end node device of the requester.

3. The authentication system of claim 1, wherein the authentication system is configured to establish, in response to the requesting of the service, the first communication channel to the requester.

4. The authentication system of claim 1, wherein the authentication system is configured to record a service requested by the requester.

5. The authentication system of claim 1,
    wherein the plurality of contact data entries are contact data entries of a plurality of human authenticators, wherein the storage device is further configured to store a plurality of identities of potential human requesters and authorization data; and
    wherein for each of the plurality of authenticators, the authorization data assign to the respective authenticator at least one of the identities of the potential requesters, which the respective authenticator is authorized to authenticate.

6. The authentication system of claim 5, wherein the selecting of the contact data entry comprises identifying one or more authenticators from the plurality of authenticators, each of the one or more identified authenticators being assigned to the claimed identity of the requester by the authorization data.

7. The authentication system of claim 1, wherein the authentication system is further configured to establish at least one further communication channel to at least one further human authenticator such that at least one of a further audio stream of the voice of the requester, a further video stream of the face of the requester and a further 3D-data stream of the face of the requester is transmittable between the end node device of the requester and an end node device of the further authenticator.

8. The authentication system of claim 7, wherein the authentication system is further configured to determine a number of the at least one further authenticator such that a security level of the authentication meets a predefined authentication security criterion.

9. The authentication system of claim 1, wherein the authentication system is configured to analyze the at least one of the audio stream, the video stream and the 3D-data stream to extract characteristics, which correspond to at least one of the requester, the authenticator and a combination of the requester and the authenticator.

10. The authentication system of claim 1, wherein the authentication communication channel is configured such that an audio stream is transmittable between the end node device of the requester and the end node device of the authenticator;

wherein the authentication system further comprises a filter, which is configured to check the audio stream for the two-way conversation between the requester and the authenticator.

11. The authentication system of claim 1, wherein the establishing of the second communication channel comprises randomly selecting a contact data entry of the end node device of the authenticator from a second subset of the plurality of contact data entries.

12. The authentication system of claim 1, wherein the authentication system is configured to select a selection algorithm from a plurality of selection algorithms, each of which configured to perform the selecting of a contact data entry of the end node device of the authenticator.

13. The authentication system of claim 12, wherein the authentication system is configured to randomly select the selection algorithm.

14. A method of authenticating a human requester requesting a service, the authenticating being performed using an authentication system and a first communication channel;
wherein the first communication channel comprises an end node device of the requester and a communication link between a first port of the authentication system and the end node device of the requester;
wherein the method comprises:
recording an identity claimed by the requester;
selecting from a plurality of contact data entries stored on a storage device of the authentication system a contact data entry of an end node device of a human authenticator depending on the claimed identity;
establishing a second communication channel via the end node device of the authenticator and a communication link between a second port of the authentication system and the end node device of the authenticator depending on the selected contact data entry;
establishing via the first and the second port an authentication communication channel comprising the first communication channel and the second communication channel such that at least one of a real-time audio stream of a voice of the requester, a real-time video stream of a face of the requester and/or a 3D-data stream of the face of the requester is transmittable between the end node device of the requester and the end node device of the authenticator;
wherein the authentication communication channel is further configured to allow the authenticator, by using the end node device of the authenticator, to listen to the voice of the requester that has been captured by the end node device of the requester and to allow a real-time two-way conversation between the requester and the authenticator via the authentication communication channel; and
wherein the method further comprises recording a confirmation message of the authenticator, wherein the confirmation message confirms or rejects at least one of the claimed identity and the requested service.

15. The method of claim 14, wherein the authentication communication channel is configured such that the authentication communication channel allows the authenticator, by using the end node device of the authenticator, to watch an image of the face of the requester that has been captured by the end node device of the requester.

16. The method according any one of claim 14, further comprising establishing the first communication channel via the end node device of the requester and the communication link between the first port of the authentication system and the end node device of the requester.

17. The method of claim 14, wherein the method comprises recording a service requested by the requester.

18. The method of claim 14,
wherein the plurality of contact data entries are contact data entries of a plurality of human authenticators, wherein the method further comprises storing on the storage device a plurality of identities of potential human requesters and authorization data; and
wherein for each of the plurality of authenticators, the authorization data assign to the respective authenticator at least one of the identities of the potential requesters, which the respective authenticator is authorized to authenticate.

19. The method of claim 18, wherein the selecting of the contact data entry comprises identifying one or more authenticators from the plurality of authenticators, each of the one or more identified authenticators being assigned to the claimed identity of the requester by the authorization data.

20. A non-transitory computer-readable storage medium storing instructions, that when executed by a computer, cause the computer to perform a method of authenticating a human requester requesting a service, the authenticating being performed using an authentication system and a first communication channel, wherein the first communication channel comprises an end node device of the requester and a communication link between a first port of the authentication system and the end node device of the requester, the method comprising:
recording an identity claimed by the requester;
selecting from a plurality of contact data entries stored on a storage device of the authentication system a contact data entry of an end node device of a human authenticator depending on the claimed identity;
establishing a second communication channel via the end node device of the authenticator and a communication link between a second port of the authentication system and the end node device of the authenticator depending on the selected contact data entry;
establishing via the first and the second port an authentication communication channel comprising the first communication channel and the second communication channel such that at least one of a real-time audio stream of a voice of the requester, and a real-time video stream of a face of the requester and a 3D-data stream of the face of the requester is transmittable between the end node device of the requester and the end node device of the authenticator
wherein the authentication communication channel is further configured to allow the authenticator, by using the end node device of the authenticator, to listen to the voice of the requester that has been captured by the end node device of the requester and to allow a real-time two-way conversation between the requester and the authenticator via the authentication communication channel; and
wherein the method further comprises recording a confirmation message of the authenticator, wherein the confirmation message confirms or rejects at least one of the claimed identity and the requested service.

21. The computer-readable storage medium of claim 20, wherein the authentication communication channel is configured such that the authentication communication channel allows the authenticator, by using the end node device of the authenticator, to watch an image of the face of the requester that has been captured by the end node device of the requester.

22. The computer-readable storage medium of claim 20, wherein the method comprises recording a service requested by the requester.

23. The computer-readable storage medium of claim 20,
    wherein the plurality of contact data entries are contact data entries of a plurality of human authenticators, wherein the method further comprises storing on the storage device a plurality of identities of potential human requesters and authorization data; and
    wherein for each of the plurality of authenticators, the authorization data assign to the respective authenticator at least one of the identities of the potential requesters, which the respective authenticator is authorized to authenticate.

24. The computer-readable storage medium of claim 23, wherein the selecting of the contact data entry comprises identifying one or more authenticators from the plurality of authenticators, each of the one or more identified authenticators being assigned to the claimed identity of the requester by the authorization data.

* * * * *